US010375926B2

(12) United States Patent
Groff (10) Patent No.: US 10,375,926 B2
(45) Date of Patent: Aug. 13, 2019

(54) TIE-OUT POST HAVING A DETACHABLE AND ROTATABLE CONNECTION POINT

(71) Applicant: LTL Wholesale, Inc., Schuylkill Haven, PA (US)

(72) Inventor: Malcolm K. Groff, Orwigsburg, PA (US)

(73) Assignee: LTL Wholesale, Inc., Schuylkill Haven, PA (US)

( * ) Notice: Subject to any disclaimer, the term of this patent is extended or adjusted under 35 U.S.C. 154(b) by 35 days.

(21) Appl. No.: 15/269,230

(22) Filed: Sep. 19, 2016

(65) Prior Publication Data

US 2017/0079239 A1    Mar. 23, 2017

Related U.S. Application Data

(60) Provisional application No. 62/220,566, filed on Sep. 18, 2015.

(51) Int. Cl.
*A01K 1/04* (2006.01)

(52) U.S. Cl.
CPC ...................... *A01K 1/04* (2013.01)

(58) Field of Classification Search
CPC ........................................ A01K 1/04
USPC ....... 119/791, 787, 795, 796, 797, 798, 793, 119/792
See application file for complete search history.

(56) References Cited

U.S. PATENT DOCUMENTS

| | | | |
|---|---|---|---|
| 62,761 A | 3/1867 | Lincoln et al. | |
| 91,042 A | 8/1869 | Raiford | |
| 227,675 A * | 5/1880 | Carnes | A01K 1/04 119/780 |
| 323,022 A * | 7/1885 | Boone | A01K 1/04 119/791 |
| 383,296 A | 5/1888 | Husselman | |
| 573,508 A | 12/1896 | Ferris | |
| 29,550 A | 10/1898 | Patterson | |
| 850,773 A | 4/1907 | Miner | |

(Continued)

OTHER PUBLICATIONS

Sandy's Upholstery & Flags, Ground Spike for Rotating Blade Pole Kit—Black, http://www.sandysupholstery.com/product/ground-spike-rotating-blade-pole.html, date, publisher, location of publication unknown, available prior to filing of provisional application.

*Primary Examiner* — Tien Q Dinh
*Assistant Examiner* — Ebony E Evans
(74) *Attorney, Agent, or Firm* — Ryder, Mazzeo & Konieczny LLC (57) ABSTRACT

A tie-out post that provides a point of connection that is fixed at a location and is capable of rotating 360 degrees around that location in either direction. When used as a pet tie-down it provides the pet with freedom to move in any direction, is not apt to entanglement, does not provide a scenario where the pet may damage the device by pulling in opposite direction of point of connection, and is not apt to wear and tear. The tie-out post includes a ground spike to be inserted in the ground and a detachable and rotatable connection head to be located on the surface of the ground. The connection head includes a connector (fully enclosed) that is centered thereon and is capable of rotating therearound. The placement of the connector at the top of the connection head minimizes the size and diameter of the tie-out post.

17 Claims, 6 Drawing Sheets

(56) References Cited

U.S. PATENT DOCUMENTS

| | | | |
|---|---|---|---|
| 1,011,729 A * | 12/1911 | Bradford | A01K 1/04 119/786 |
| 1,092,036 A | 3/1914 | Fry | |
| 1,438,074 A | 12/1922 | Welch | |
| 1,456,627 A * | 5/1923 | Delbridge | A01K 1/04 119/780 |
| 2,087,176 A | 7/1937 | Webb | |
| 2,472,926 A | 6/1949 | Sullivan | |
| 2,525,890 A * | 10/1950 | Gage | A01K 1/04 119/787 |
| 2,551,540 A * | 5/1951 | Johnson | A01K 1/04 119/786 |
| 3,079,158 A | 2/1963 | Finn et al. | |
| 3,100,476 A | 8/1963 | Peak | |
| 3,508,525 A | 4/1970 | Sawyer | |
| 3,531,090 A | 9/1970 | Laible | |
| 3,645,537 A | 2/1972 | Parenteau | |
| 4,271,646 A | 6/1981 | Mills | |
| 4,324,388 A | 4/1982 | Klaser | |
| 4,491,091 A * | 1/1985 | Satterfield | A01K 1/04 119/780 |
| 4,581,806 A | 4/1986 | Minoshima | |
| 4,582,257 A | 4/1986 | Siegler | |
| 4,588,157 A | 5/1986 | Mills | |
| 4,800,843 A * | 1/1989 | Wendling | A01K 1/04 119/780 |
| 4,874,149 A | 10/1989 | Miceli | |
| 4,939,877 A | 7/1990 | Claffey | |
| 5,148,641 A | 9/1992 | Rushing et al. | |
| 5,158,231 A | 10/1992 | Christen et al. | |
| 5,222,703 A * | 6/1993 | Ricciardelli | A63B 55/50 248/156 |
| D346,036 S * | 4/1994 | Garber | D25/126 |
| 5,365,689 A | 11/1994 | Holliman | |
| 5,392,554 A * | 2/1995 | Farstad | A01M 31/06 43/3 |
| 5,732,659 A | 3/1998 | Wiggins | |
| 5,785,007 A * | 7/1998 | Sauber | A01K 1/04 119/771 |
| 5,957,092 A | 9/1999 | Colsch | |
| 5,971,668 A | 10/1999 | Miller | |
| 6,274,074 B1 | 8/2001 | Monie | |
| 6,314,916 B1 * | 11/2001 | Watson, Sr. | A01K 1/04 119/769 |
| 6,402,115 B1 * | 6/2002 | Groff | B29C 45/14426 248/156 |
| 6,719,939 B2 | 4/2004 | Groff et al. | |
| 6,745,990 B2 | 6/2004 | Groff et al. | |
| 6,810,630 B2 | 11/2004 | Chizmas | |
| 7,302,904 B2 | 12/2007 | Burns | |

* cited by examiner

TIE-OUT POST HAVING A DETACHABLE AND ROTATABLE CONNECTION POINT

PRIORITY

This application claims the priority under 35 U.S.C. § 119 of Provisional Application Ser. No. 62/220,566, filed on Sep. 18, 2015, entitled "Rotating Metal Ground Spike Tie-Out Post for Pets with Detachable Swivel" and having Malcolm K. Groff as inventor. Application No. 62/220,566 is incorporated herein by reference in its entirety.

BACKGROUND

Ground spikes are a type of anchor device that are utilized to secure a variety of items to the ground. Ground spikes typically include an insert and a head. The insert is typically narrow at one end (possibly forming a point) and extends outward therefrom (possibly in the form of fins). The narrow end is typically driven (e.g., pushed, screwed, hammered) into the ground until a majority of the insert is in the ground with or without the use of tools. The insert may be of such a length that it is driven deep enough into the ground to prevent it from being pulled out easily based on the use thereof.

The head is typically located on top of the insert and remains above the ground. The head may be used to receive an item inserted therein or to secure an item to the ground. The spike may keep the item stable and secure from external forces. The head may come in various configurations depending on the use. For example, if the ground spike is to provide an anchor for a post (e.g., mailbox, fence) the head may include a seat to receive the post.

If the ground spike is to secure an item (e.g., tent, tarp) to the ground to prevent external forces (e.g., wind) from moving the item, the head may include a connector extending downward from the head that can contact the ground or be inserted into the ground. The connector may be secured on the item (e.g., into an inlet on the item) or into the ground after a rope or the like is wrapped around it. Alternatively, the head may include a hole formed therethrough that a rope, chain or the like can be fed through to secure the item thereto. A ground spike that has a head with a hole formed therethrough may also be used for security purposes. For example, the ground spike may be placed close to an item (e.g., boat, bike, furniture) and then a chain may be fed through the hole and around the item. Such a configuration would require the ground spike to be removed or the chain cut in order to remove the item.

The ground spike with the head having a hole formed therethrough may also be used as a tie-out post for pets. One end of a pet's leash may be tied around the hole and the other end may be secured to the pet. The problem with this type of configuration is the connection point is stationary so it may not provide the pet with sufficient freedom to move about while tied to the post. Furthermore, it may be prone to have the pet's leash tangle around the post.

Some ground spikes may have a head that includes a hook or ring that is capable of pivoting around the insert so that the pet's leash may spin around the ground spike as the pet moves around the ground spike (the point of connection moves). However, the point of connection is apt not to move if the leash is not taught. Accordingly, such a configuration may still be susceptible to entanglements of the leash and the ground spike, which may result in restricting the pet's movement or possibly harming the pet. Furthermore, such a configuration may be susceptible to damage if the pet pulls in a direction opposite the connection point (pet moves to other side without rotating connection point). Moreover, the rotation of the hook or ring around the insert may also result in wear to the ring, the insert or both which could eventually require replacement.

What is needed is a ground spike tie-out post for pets that permits securely tying a pet outside, but also allows the pet to have maximum freedom of mobility, averts entanglements of the pet's leash with the tie-out post, and prevents wear on the assembly from use.

BRIEF DESCRIPTION OF THE DRAWINGS

The features and advantages of the various embodiments will become apparent from the following detailed description in which.

DETAILED DESCRIPTION

The current invention is a ground spike for use as a tie-out post (e.g., pet tie-out post) that provides a point of connection that is fixed at a location and is capable of rotating 360 degrees around that location in either direction. Such a configuration provides the pet with freedom to move in any direction, is not apt to entanglement, does not provide a scenario where the pet may damage the device by pulling in opposite direction of point of connection, and is not apt to wear and tear due to the rotation of the parts with respect to one another.

Figure 1:
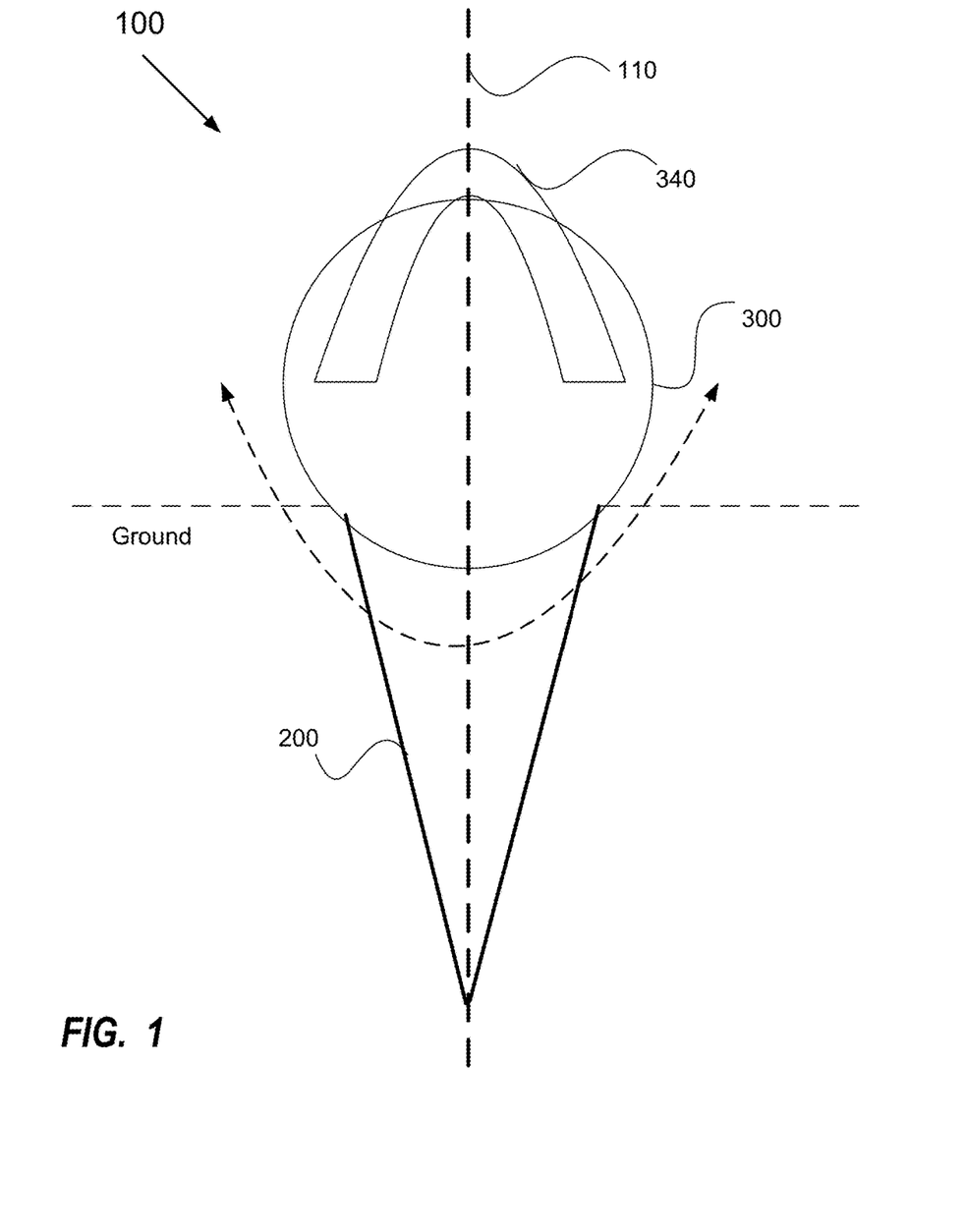
FIG. 1 illustrates a perspective view of an example tie-out post, according to one embodiment.

FIG. 1 illustrates a perspective view of an example tie-out post 100 (e.g., pet tie-out post). The tie out post 100 includes a ground spike 200 and a detachable and rotatable connection head 300. The ground spike 200 may taper to a narrow lower end so as to be able to be inserted into the ground. The connection head 300 may include a connector (fully enclosed) 340 that is centered thereon and is capable of rotating therearound (in either direction). For example, the connector 340 may rotate in either direction around a central axis 110 of the pet tie-out post 100. The ground spike 200 may be located in the ground and the connection head 300 may be located above the ground. The placement of the connector 340 at the top of the connection head 300 minimizes the size and diameter of the tie-out post 100 and allows full three hundred sixty degree rotation of the connector 340. Such a configuration removes any directional inhibitions on a pet's movement around the tie-out post 100.

Figure 2:
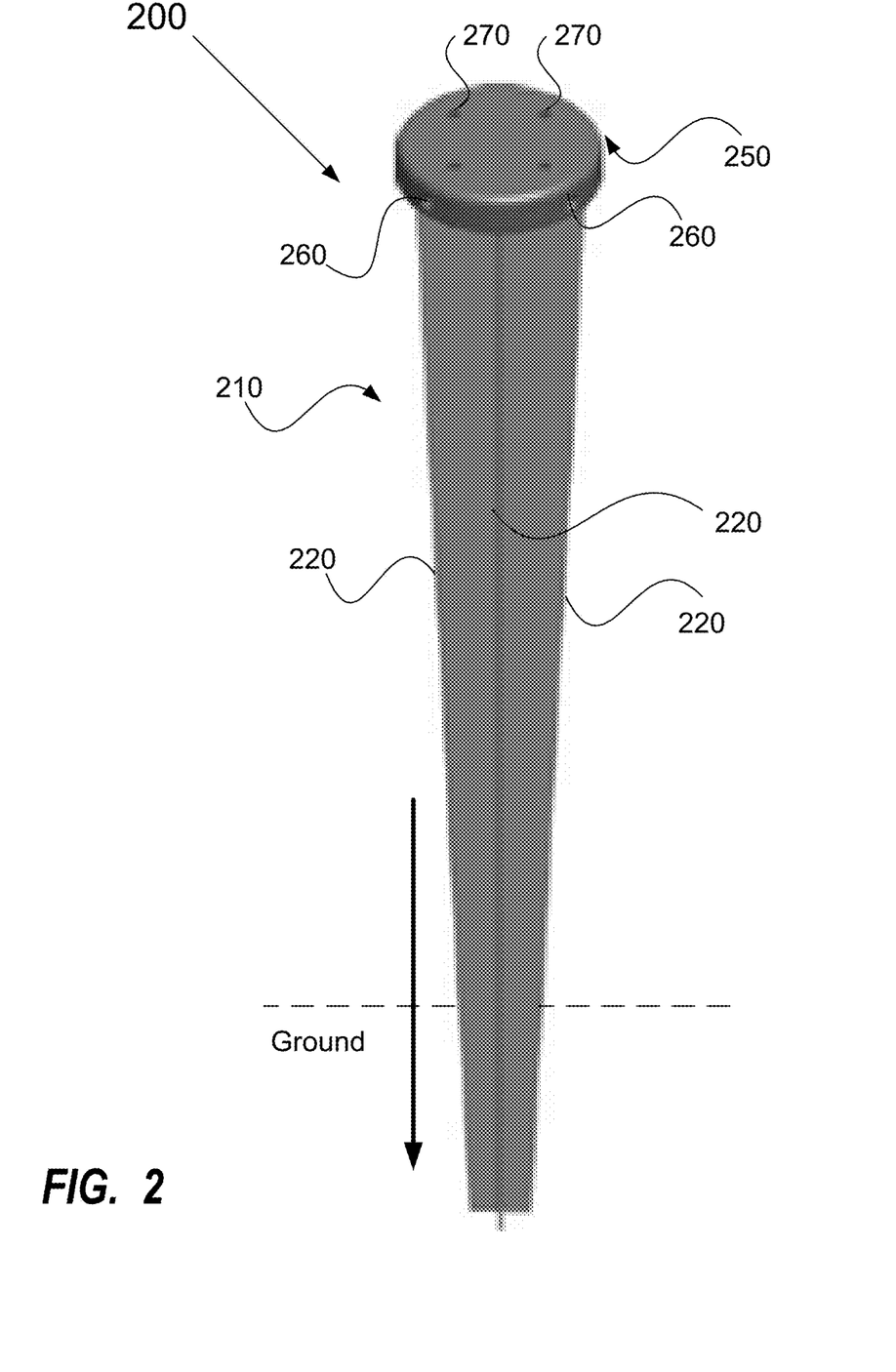
FIG. 2 illustrates a perspective view of an example ground spike utilized in an example pet tie-out post, according to one embodiment.

FIG. 2 illustrates an example ground spike 200 utilized in an example tie-out post 100. The ground spike 200 includes an insert 210 and a head 250. The insert 210 includes a plurality of fins 220 that taper in width from the top to the bottom in order to enable the insert 210 to be inserted into the ground. As illustrated, the insert 210 includes four fins 220 disposed approximately 90 degrees from each other with the left, right and front fins 220 being visible while the back fin is not. However, the number and orientation of the fins 220 is not intended to be limited thereby. As illustrated, the bottom of the fins 120 are flat but are not limited thereto.

The head 250 is located on top of the insert 210 (in contact with the wide side of the fins 220). The head 250 may be used to assist in driving the ground spike 200 into the ground (e.g., push on the head 250, strike the head 250 with hammer or mallet). The head 250 may have a flat top and be circular in order to receive the rotatable connection head 300. The head 250 may include a plurality of threaded holes 260 along an edge thereof in order to enable the rotatable connection head 300 to be secured thereto using screws or the like. The head 250 may also include a plurality of weep holes 270 extending from top to bottom to allow any condensation that gets between the head 250 and the rotatable connection head 300 to drain therefrom.

According to one embodiment, the ground spike 200 is made of plastic. However, the invention is in no way intended to be limited thereby. Rather, the ground spike 200 could be made of metal or any other type of material that would be strong enough to be driven in the ground and would not rot in the ground. According to one embodiment, the ground spike 200 may be molded as a single piece. Alternatively, the ground spike 200 could be formed of two or more pieces that are connected together in some fashion (e.g., welded, glued). According to one embodiment, the ground spike 200 may include one or more metal components that plastic is molded around. For example, a metal rod may extend down the center of a mold and the fins 220 may be molded therearound. A metal plate may extend across a top of the mold and the head 250 may be molded therearound. A metal spike including a rod and head may be used in the mold to provide support for both the fins 220 and the head 250. According to one embodiment, the metal rod may include a point at the lower end of the fins 220 and the mold may extend around the point or the point may extend from the mold. The point may assist in driving the ground spike 200 into the ground.

Figure 3A:
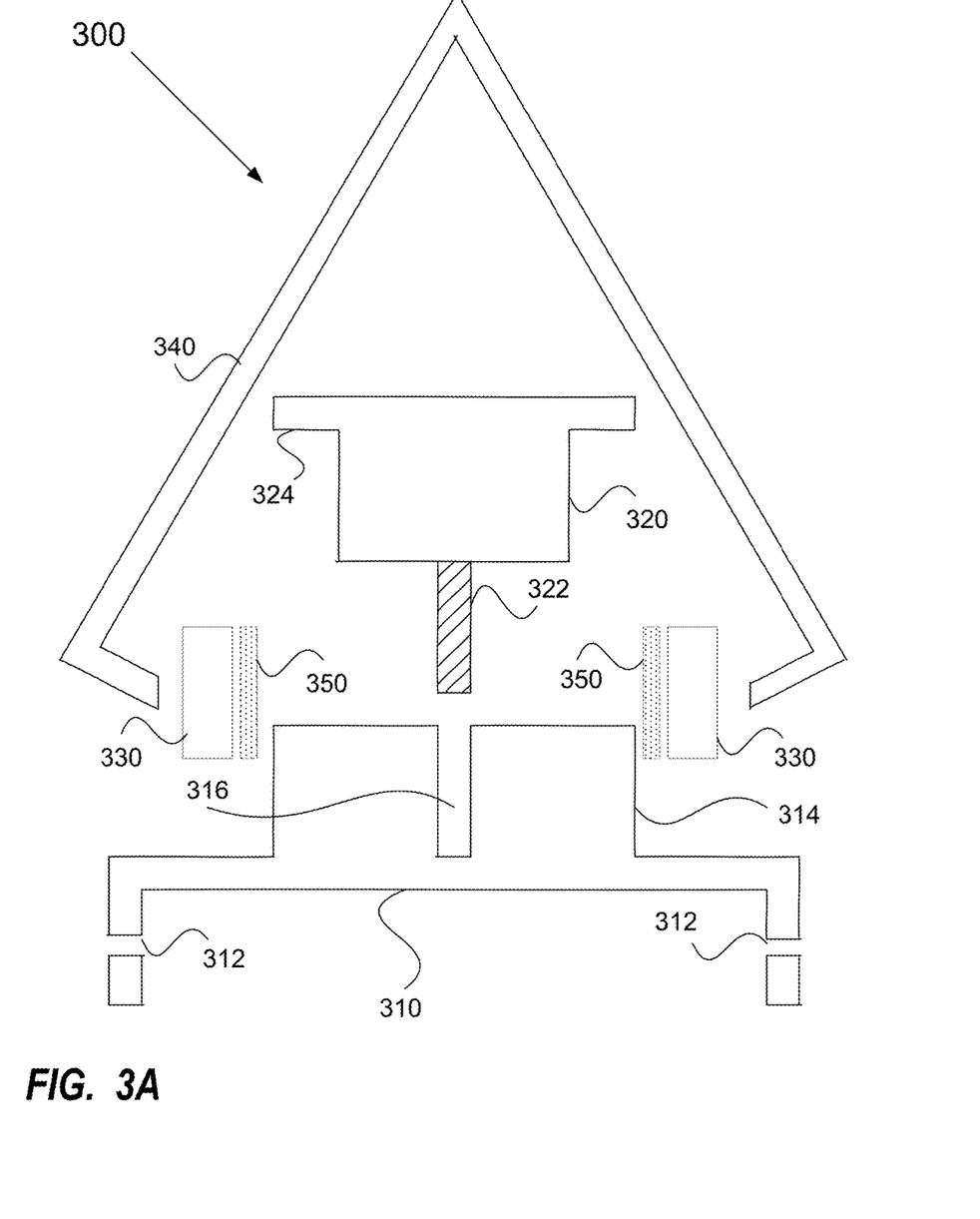
FIG. 3A illustrates an exploded cross sectional side view of an example detachable and rotatable connection head utilized in an example tie-out post, according to one embodiment.
Figure 3B:
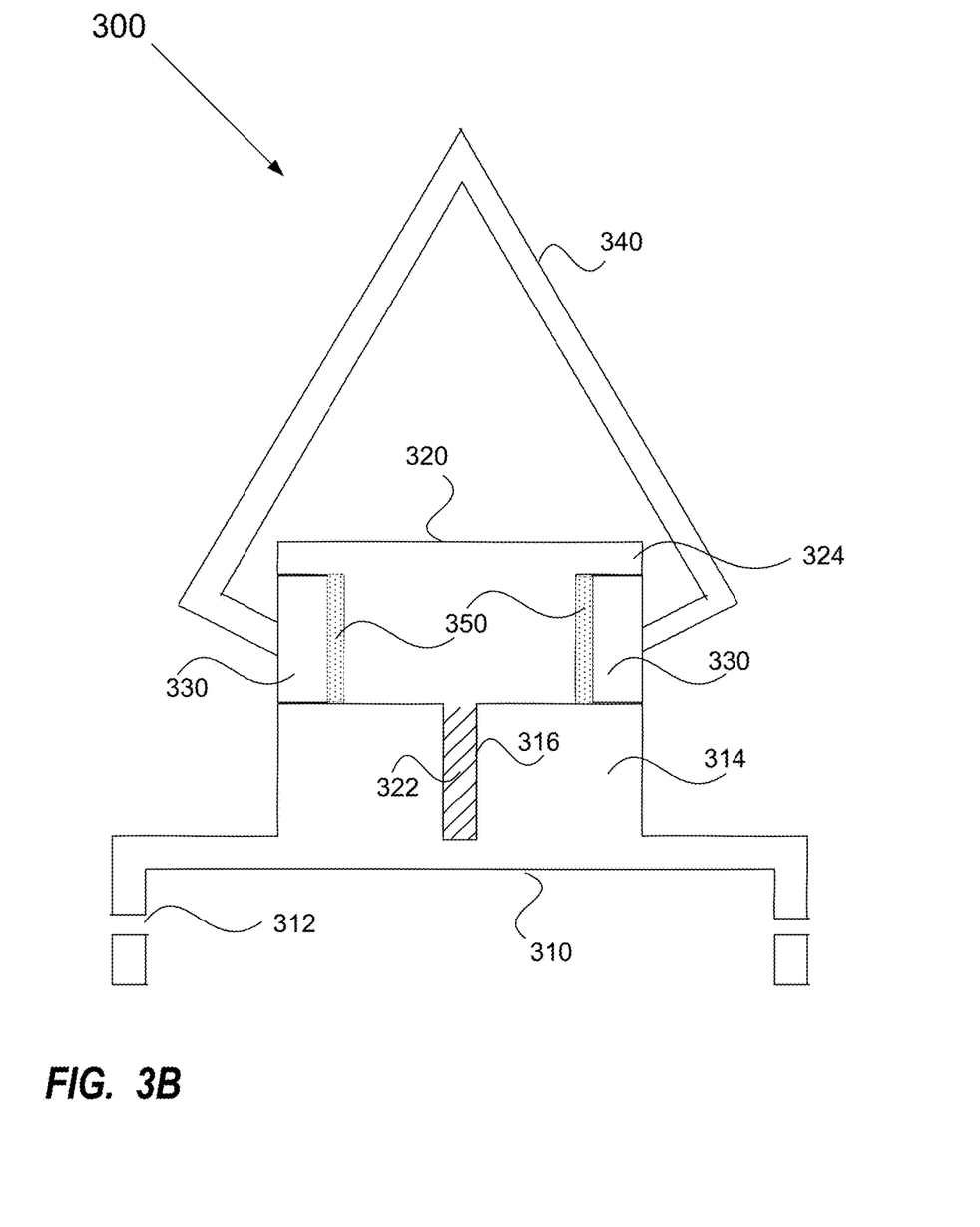
FIG. 3B illustrates a cross sectional side view of an example detachable and rotatable connection head utilized in an example tie-out post, according to one embodiment.

FIGS. 3A-B illustrate an exploded cross sectional side view and a cross sectional side view of an example detachable and rotatable connection head 300 utilized in an example tie-out post 100. The connection head 300 may include a cap 310, a stationary ring 320, a rotating ring 330 and the connector 340. The cap 310 may cover the head 250 and extend onto the sides of the head 250. The cap 310 may include holes 312 formed therein in alignment with the threaded holes 260 so that the connection head 300 can be secured to the ground spike 200. The cap 310 may include a raised portion 314 in the center thereof that includes a threaded hole 316 formed therein to receive the stationary ring 320. The stationary ring 320 includes a threaded screw 322 extending from the bottom thereof to be received by the threaded hole 316 within the raised portion 314 so that it can be connected to the cap 310. The stationary ring 320 may include a lip 324 on an upper edge thereof. The rotating ring 330 encircles the stationary ring 320 and may rotate therearound. The rotating ring 330 may be secured between the lip 324 and the cap 310 (as can be seen in FIG. 3B).

According to one embodiment, the connection head 300 may further include a ball bearing 350 located between the rotating ring 330 and the stationary ring 320 to assist in the rotation therearound. Moreover, the use of the ball bearing 350 reduces the resultant wear on the rotating ring 330 and the stationary ring 320.

The connector 340 is connected to the rotating ring 330 so that it rotates on a central axis. It is anticipated that a pet would be on a leash that was connected to the connector 340, and that as the pet moved, the connector 340 and rotating ring 330 would rotate as necessary around the central axis. The connection point is always at the same location but is capable of rotating at that point.

Figure 3C:
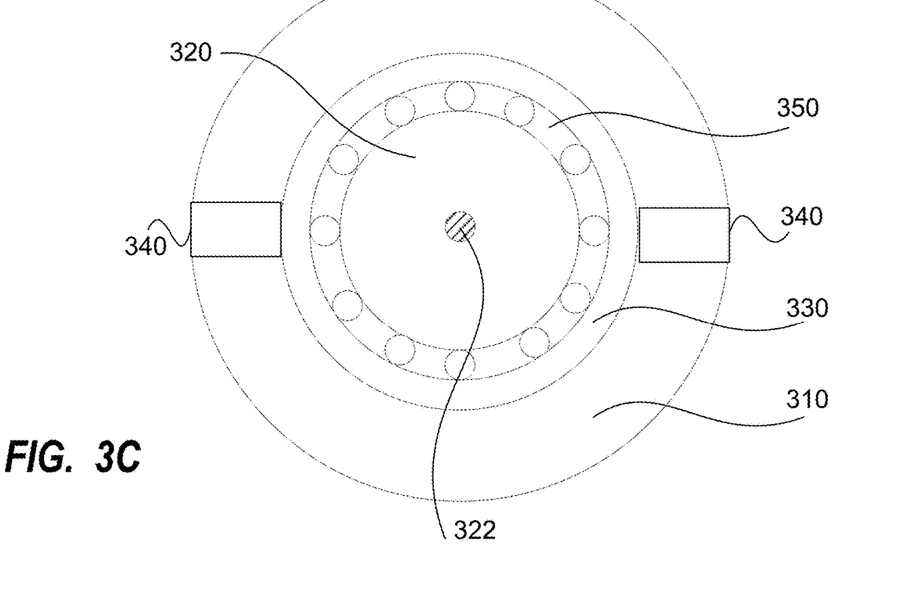
FIG. 3C illustrates a cross sectional top view of an example detachable and rotatable connection head utilized in the example tie-out post, according to one embodiment.

FIG. 3C illustrates a cross sectional top view of an example detachable and rotatable connection head 300 utilized in the example tie-out post 100. The stationary ring 320 is in the center surrounded by the rotating ring 330. According to one embodiment, the ball bearing 350 may be located between the rotating ring 330 and the stationary ring 320 to assist in the rotation therearound. The connector 340 may extend from the sides of the rotating ring 330. The sides of the cap 310 extend further than the stationary ring 320, the ball bearing 350 and the rotating ring 330. The raised portion of the cap 314 is not visible as it would be below the stationary ring 320, the ball bearing 350 and the rotating ring 330. The threaded screw 322 is located in the center of the stationary ring 320.

The connection head 300 may be provided as a single unit that is connected to the ground spike 200 after the ground spike 200 is secured into the ground. Furthermore, the connection head 300 may be removed from the ground spike 200 after the pet tie-out post 100 is installed if required or desired (e.g., to cut the lawn).

The components of the connection head 300 (the cap 310, the stationary ring 320, the rotating ring 330, the connector 340, the ball bearing 350) may be separately made and assembled together. The components of the connection head 300 may be made of materials that can withstand the elements (e.g., will not rust) and that are sturdy enough to handle a pet being attached thereto (e.g., hard plastic, metal). According to a preferred embodiment, at least the components that are subject to the external elements (e.g., the cap 310, the rotating ring 330, the connector 340) are made of stainless steel.

It should be noted that the connector 340 of FIGS. 3A-C is illustrated as a generally diamond shape with the bottom of the diamond replaced by the rotating ring 330. The connector 340 includes rounded corners so that a leash will not get caught in any of the corners. This configuration enables the leash to settle in one of the corners without getting stuck therein and also provides a means for the leash to be pulled from one corner to the other. However, it should be noted that the connector 340 is not limited to the configuration (e.g., shape) illustrated. Furthermore, the connector 340 has been discussed as being fully enclosed with no moving parts or parts that can open. However, the invention is in no way limited thereto. Rather, the connector 340 could include a portion capable of being opened to allow a leash, rope, chain or the like to be secured therein.

Figure 4:
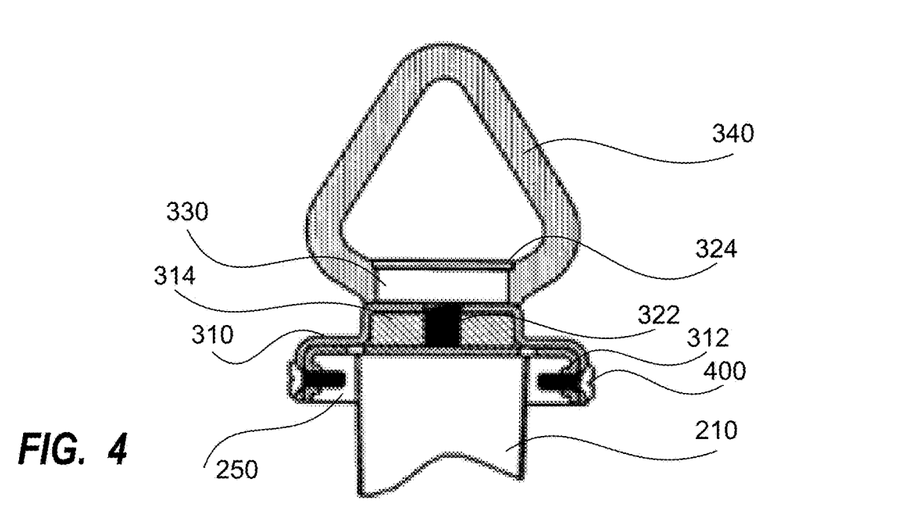
FIG. 4 illustrates a side view of the example detachable and rotatable connection head connected to the example ground spike, according to one embodiment.

FIG. 4 illustrates a side view of the example connection head 300 connected to the example ground spike 200. The cap 310 of the connection head 300 is connected to the head 250 of the ground spike 200 via screws 400. The screws 400 are placed through the holes 312 into the threaded holes 260.

Figure 5:
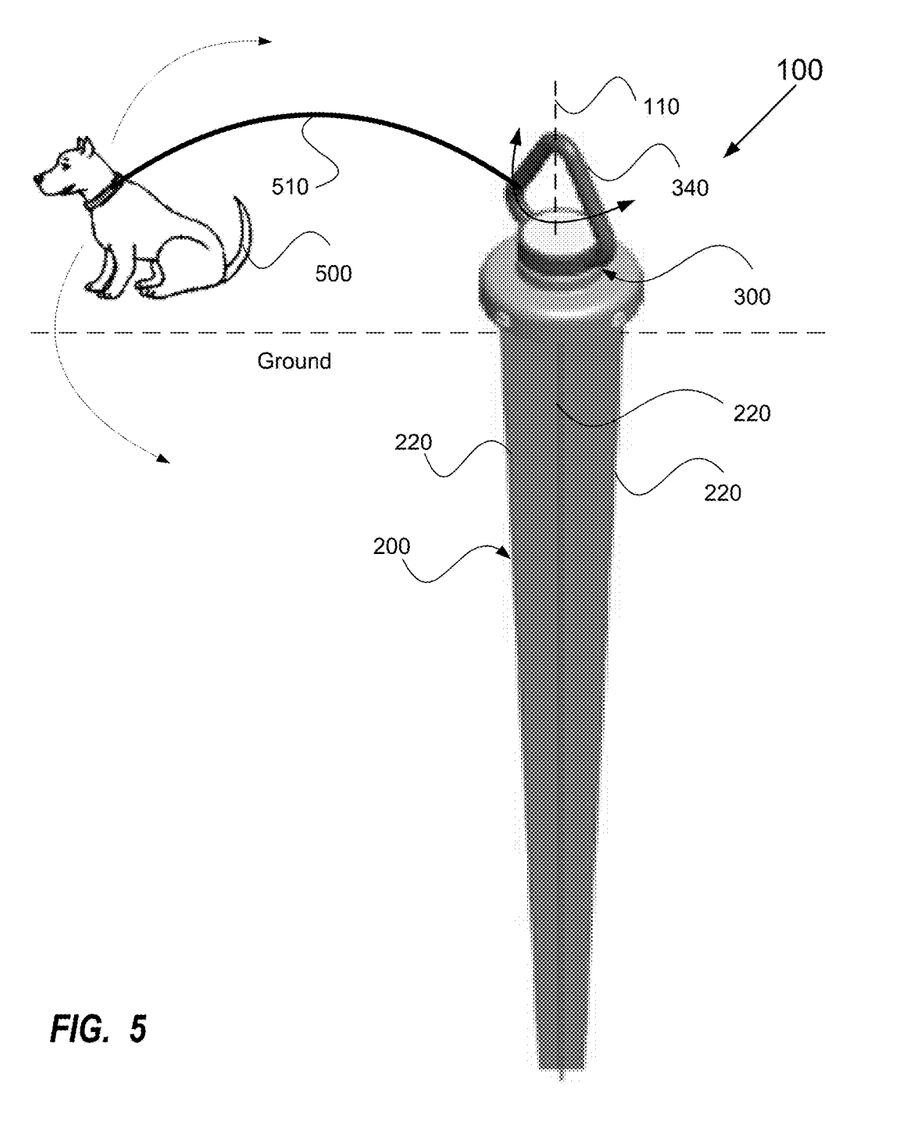
FIG. 5 illustrates a perspective view of an example tie-out post installed and ready for use, according to one embodiment.

FIG. 5 illustrates a perspective view of an example tie-out post 100 installed and ready for use. The ground spike 200 is driven into the ground and the connection head 300 is located above the ground with the connector 340 extending up therefrom. A pet 500 is tied to a leash 510 and the leash 510 is secured to the connector 340. The pet 500 may run around the pet tie-out post 100 in any direction and the connector 340 will rotate therewith (when the appropriate tension is provided).

As such, a pet 500 tied to the pet tie-out post 100 is free to move in any direction around the pet tie-out post 100. The position and free rotation of the connector 340 enables the pet's leash 510 to remain fastened to the connector 340 while the pet 500 is free to move in various directions. Because the connector 340 rotates around a stationary point 110 the leash 510 is less likely to become tangled.

It should be noted that the tie-out post 100 has been described with respect to pets. However, the invention is not limited thereto. Rather the tie-out post 100 can be utilized to secure anything that you want to have the ability to move around the post.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. A tie-out post comprising
a ground spike to be driven into ground, wherein the ground spike includes an insert to be inserted into the ground and a head located on top of the insert to be located above the ground; and
a connection head to be attached to the head of the ground spike, wherein the connection head includes
a main body to be placed on and secured to the head of the ground spike, wherein the main body includes a raised central portion having a threaded hole formed therein;
a stationary ring to connect to a center portion of the main body, wherein the stationary ring includes a threaded portion extending from a lower surface thereof, wherein the stationary ring is secured to the main body by screwing the threaded portion into the threaded hole;
a rotatable ring to encircle the stationary ring, wherein the rotatable ring is capable of rotating around the stationary ring; and
a connector to connect to and extend from the rotatable ring in a direction away from the ground spike, wherein the connector is capable of rotating around a central axis of the tie-out post when the rotatable ring is rotated.

2. The tie-out post of claim 1, wherein the connection head further includes a ball bearing located between the stationary ring and the rotating ring.

3. The tie-out post of claim 1, wherein the main body, rotating ring and the connector are made of stainless steel.

4. The tie-out post of claim 1, wherein the insert includes a plurality of tapered fins extending from the central axis.

5. The tie-out post of claim 4, wherein the ground spike includes a metal spike located at the central axis, wherein the plurality of tapered fins and the head are formed around the metal spike.

6. The tie-out post of claim 1, wherein the head includes a plurality of threaded holes to enable the connection head to connect to.

7. The tie-out post of claim 1, wherein the ground spike is made of plastic.

8. The tie-out post of claim 1, wherein the stationary ring includes a lip extending from an upper edge thereof; and the rotating ring is located between the lip and the main body.

9. A tie-out post comprising
a ground spike including a plurality of tapered fins extending from a central axis and a head located on top of the plurality of tapered fins, wherein the plurality of tapered fins are to be inserted into ground and the head is to be located on the ground; and
a connection head to be attached to the head of the ground spike, wherein the connection head includes
a main body to be located on and secured to the head of the ground spike, wherein the main body includes a raised central portion having a threaded hole formed therein;
a stationary ring to be centrally located on and secured to the main body, wherein the stationary ring includes a threaded portion extending from a lower surface thereof, wherein the stationary ring is secured to the main body by screwing the threaded portion into the threaded hole;
a rotating ring having an open center and being placed around the stationary ring so as to be able to rotate around the stationary ring; and
a connector connected to the rotating ring, wherein the connector extends in an upward direction from the ground spike, wherein when the connector has an appropriate tension applied thereto it will cause the rotating ring and the connector to rotate in an appropriate direction around the central axis.

10. The tie-out post of claim 9, wherein the connection head further includes a ball bearing located between the stationary ring and the rotating ring.

11. The tie-out post of claim 9, wherein the head of the ground spike includes a plurality of threaded holes on a side thereof and the main body of the connection head includes a side and a plurality of holes in alignment with the plurality of threaded holes to enable the connection head to be secured to the head of the ground spike.

12. The tie-out post of claim 9, wherein the main body, the rotating ring and the connector are made of stainless steel.

13. The tie-out post of claim 9, wherein the connector is fully enclosed.

14. The tie-out post of claim 9, wherein the stationary ring includes a lip extending from an upper edge thereof; and the rotating ring is located between the lip and the main body.

15. A tie-out post comprising
a ground spike having an insert and a head located on top of the insert, wherein the insert is to be located below ground to secure the ground spike and the head is to be located on the ground; and
a connection head to be removably connected to the head of the ground spike, wherein the connection head includes
a main body to be placed on and secured to the head of the ground spike, wherein the main body includes a raised central portion having a threaded hole formed therein;

a stationary ring to connect to a center portion of the main body, wherein the stationary ring includes a threaded portion extending from a lower surface thereof, wherein the stationary ring is secured to the main body by screwing the threaded portion into the threaded hole, and wherein the stationary ring includes a lip extending from an upper edge thereof;

a ball bearing to encircle the stationary ring;

a rotatable ring to encircle the ball bearing, wherein the ball bearing and the rotatable ring are secured between the lip of the stationary ring and the main body; and a connector to extend from the rotatable ring, wherein the connector is capable of rotating around a central axis of the tie-out post.

16. The tie-out post of claim 15, wherein the head of the ground spike includes a plurality of threaded holes on a side thereof and the main body of the connection head includes a side having a plurality of holes in alignment with the plurality of threaded holes to enable the connection head to be secured to the head of the ground spike.

17. The tie-out post of claim 15, wherein the connector includes corners between sides that are substantially rounded.

* * * * *